United States Patent Office 2,910,943
Patented Nov. 3, 1959

2,910,943

AUTOMATIC CONTROL FOR VARIABLE CAPACITY PUMPS

George Ewart Edward Marshall, Lansdown, Bath, and Gordon Inker, Bath, England, assignors to Stothert & Pitt, Limited, Bath, England, a British company Application December 26, 1956, Serial No. 630,543

14 Claims. (Cl. 103—11)

This application is a continuation-in-part of abandoned application Serial No. 477,894, filed December 27, 1954.

This invention relates to automatic control devices for pumps by means of which two or more pumps may be so controlled in unison that the ratio of the outputs of the pumps remains constant.

In the blending of fuel oils, for example, oils of various viscosities are mixed in predetermined proportions to produce a desired grade and it is convenient to blend the constituent oils by pumping them at predetermined rates into a mixing tank.

The object of the present invention is to provide a device which when set will automatically control the pumping of the constituent oils in the desired proportions.

Since the output of a pump will vary under different conditions of pressure and viscosity of the fluid being pumped it is desirable that variations in these factors should be taken account of in the setting and regulating of an automatic device.

The present invention therefore provides a control mechanism for a system of pumps, comprising primary settable means for setting the output of each pump each settable means being adjustable individually to set the outputs of the pumps in a given ratio, a common control device, means linking said common control device to all of said primary settable means for the simultaneous adjustment thereof to vary the outputs of the pumps but to maintain said outputs in said given ratio, a secondary settable means for each pump for adjusting the output thereof independently of said common control device, the said secondary settable means being arranged to operate independently of the associated said primary means and independently of each other, and means subject to the pressure at the discharge side of each pump for adjusting the associated secondary settable means automatically whereby the output of each pump is controlled so as to maintain said given ratio of outputs.

Further, in one form, such a control device also comprises a safety device by means of which, if the pressure in one pumping line should rise above a predetermined limit, for example, due to closure of a valve in that particular line, the output of all the pumps controlled by the device is reduced in predetermined ratio.

The control device may be applied to variable capacity pumps or to fixed capacity pumps driven through infinitely variable speed gears. In the one case the device controls the capacity of the pumps and in the other case it controls the speed of the pumps.

It is well known that the volumetric efficiency of pumps and meters are affected by the viscosity of fluid which they are handling and the present apparatus is controlled by a viscosity correction factor, which is set before pumping and blending operations begin, to agree with the viscosity of fluid being handled and thereafter the apparatus will be fully automatic.

The blend ratio and viscosity settings may be rendered inaccessible except to an authorised person but should it be necessary to vary the combined rate of throughput from the pumps a hand wheel is always available which can be manually operated to decrease or increase the outputs in such a manner that the ratio of blend is kept constant, the rate of output from each pump being shown on dials corresponding to the pumps. This output regulating hand wheel is for the operation by the usual personnel whose only duty relative to the pump need be to operate the hand wheel to keep the throughput in accordance with instructions which may be varied from time to time during the pumping operation.

As applied to an apparatus comprising two pumps, the control panel has two dials which relate to the two pumps and are marked to indicate the actual rate of discharge from the pumps. The pointers of each of these dials are controlled by a link mechanism embodying a variable stroke which is adjusted to a scale marked to indicate the rate of output. The link mechanisms are interlocked where they are controlled by a single hand wheel which, when operated, will turn the two pointers simultaneously in such a manner that the rates of flow indicated on the dials will always remain in the same ratio.

Where transmitters are used for linking the control device to the pumps, the units at the transmitting end of the link may be coupled, e.g. through their rotors, to the dial pointers referred to above, the units at the receiving end of the link being similarly coupled to the mechanisms for controlling the output of the pumps. As the pointer on the control panel and the transmitter rotor coupled to it are rotated a torque is generated on the rotor of a receiver to cause it to follow the movement of the first rotor. This torque can operate the switch of a regulating motor and cause said motor to operate a pump output adjusting mechanism until the angular position of the rotor of the receiver corresponds with that of the rotor of the transmitting unit. Conveniently, three transmitter units may be used, one picking up the input motion from the control panel, the second controlling the pump output adjusting mechanism, and the third for resetting the system effectively to its initial condition.

The transmitter units on the control panel will be rotatably mounted in bearings, and the position of the dial pointers to which their rotors are coupled may be controlled by a link mechanism having adjustment which can be set to suit the viscosity of fluid being handled.

In addition a pressure cylinder will be included so that correction for pressure will be automatically carried out to ensure that the output indicated by the pointer will be always correct irrespective of changes in working pressure.

One embodiment of the invention for controlling two pumps is illustrated in the accompanying drawings in which.

Figure 1:
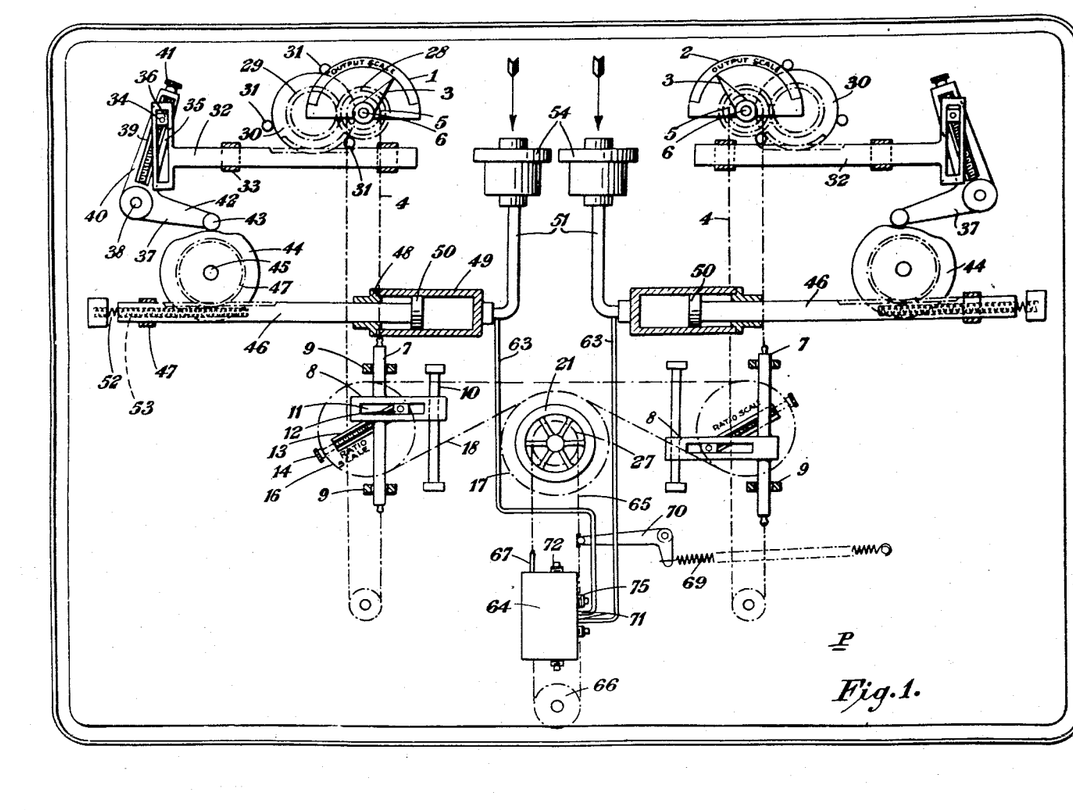
Figure 1 is a diagrammatic view of the control panel with the cover plate removed, of a device for controlling two pumps through suitable transmitter units.
Figure 2:
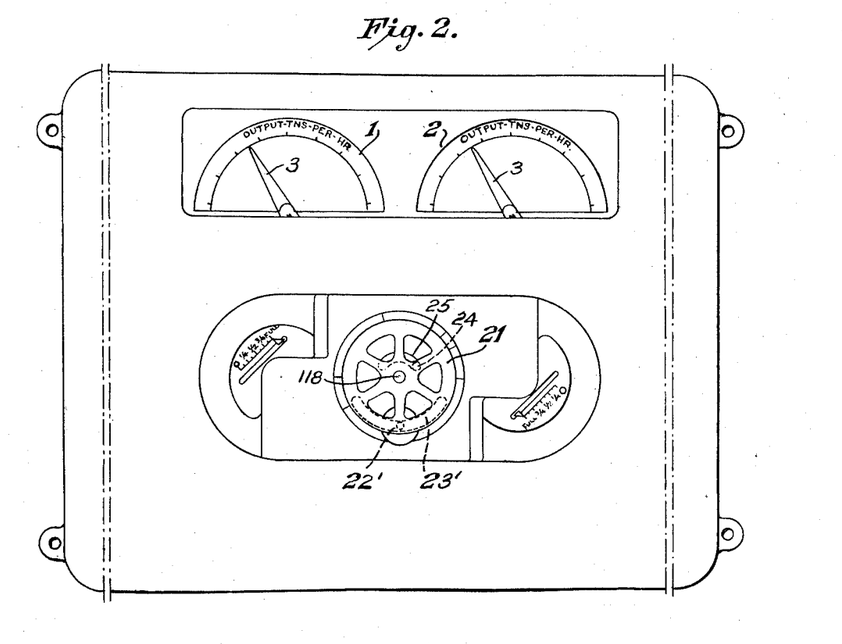
Figure 2 shows the front cover on a reduced scale.
Figure 5:
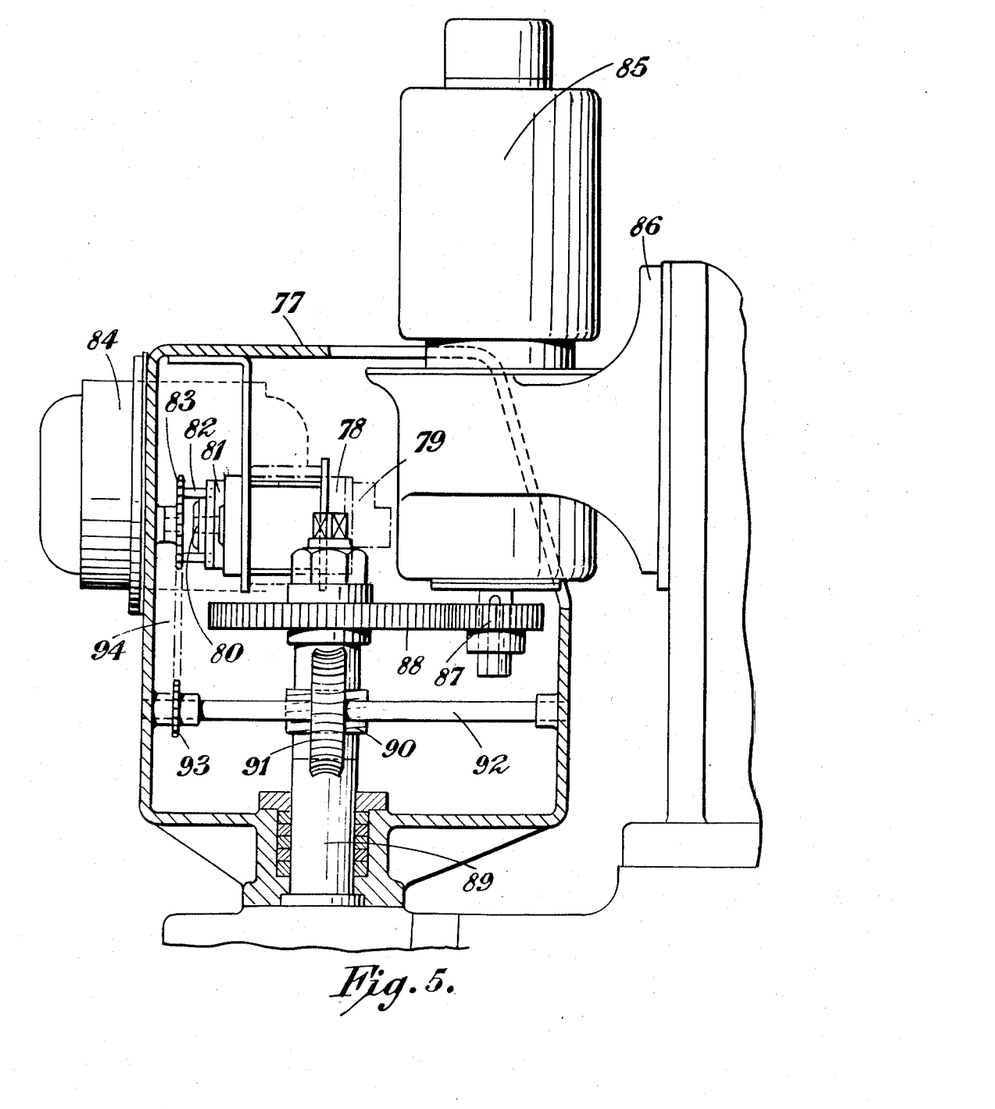
Figure 5 is a view of mechanism for controlling the output of a pump in response to signals from the panel shown in Figure 1.

The device consists of two main parts, a control panel as shown generally in Figure 1 at which signals are generated which are transmitted to an operating mechanism as shown in Figure 5 for operating the pump control mechanism.

Figure 9:
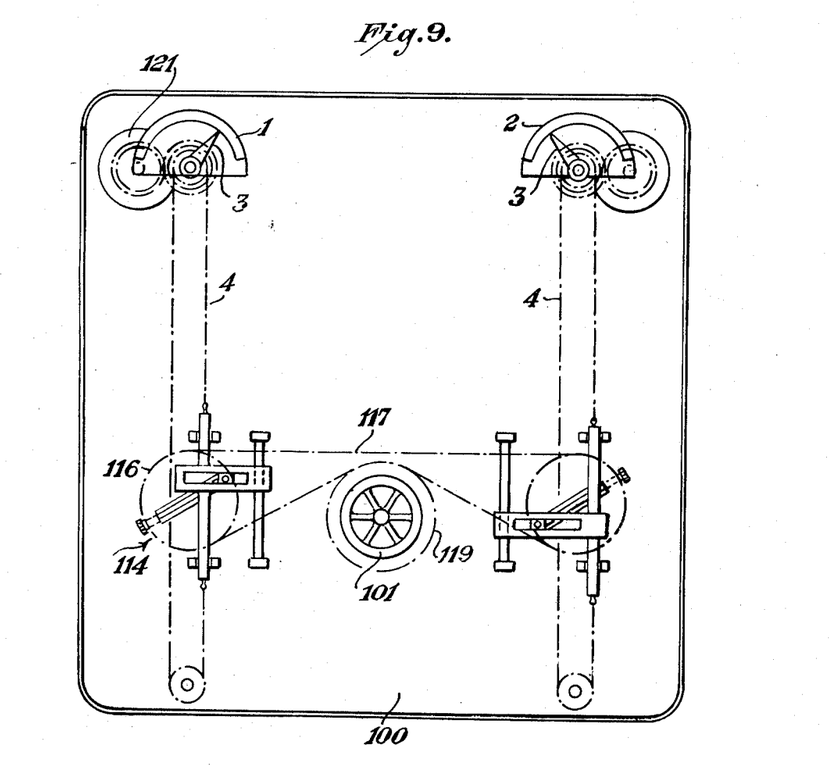
Figure 9 is a diagrammatic layout showing the control panel and associated control mechanism for use when pumps are placed at an appreciable distance apart from one another.

Referring to Figures 1 and 9 the panel P has two dials 1 and 2 which are marked so that needles 3 which are linked to the pump control mechanism in the manner hereinafter to be described, indicate the rate of discharge from the two pumps to which they are related. The needles 3 are operated by chains 4 passing round sprockets 5 mounted on the same shaft 6 as the needles. The ends of each chain 4 are attached to connecting rods 7 extending transversely from near one end of a yoke piece 8. The rods 7 are mounted slidably in guides 9 and the end of each yoke piece opposite to that near which the connecting rod is connected is slidably mounted on a guide 10. The guide 10 is arranged parallel to the connecting rod 7 so that the control member as a whole, that is, the combination of connecting rod and yoke piece, may slide in a direction transverse to a slot 11 provided in the yoke piece and thereby adjust through chain 4 the position of needle 3 on the scale 1.

Figure 3:
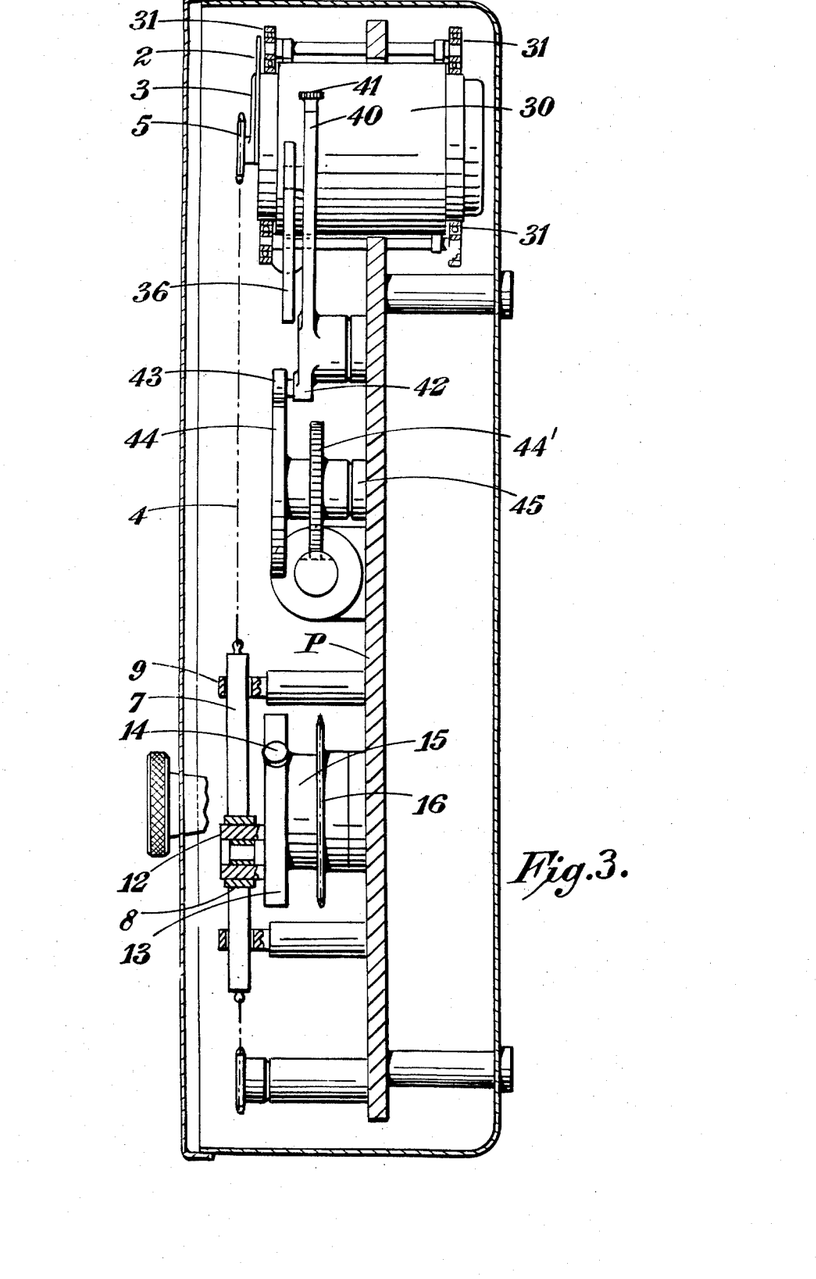
Figure 3 is a part sectional end-on view of the panel of Figure 1.

The control member is positioned by means of a slider 12 located in the slot 11. The slider 12 is adjustable on a guideway 13 by means of adjusting screw 14. The guideway itself is mounted on a shaft 15 (Figure 3) to which is also fixed a chain sprocket wheel 16.

The position of the control member may therefore be adjusted by rotation of the guideway 13 and sprocket wheel 16. When the sprocket wheel 16 is moved through a certain angle the change in position of the control member will be dependent on the position of the slider 12 in the guideway 13. For example, by adjusting the slider outwardly and away from the centre of rotation of the shaft 15 the movement of the control member may be amplified. That is to say, the combination of slider 12, adjusting screw 14 and guideway 13 mounted on the shaft 15 provides a lever the effective length of which may be varied.

Rotation of the sprocket wheels 16 is controllable by a common control wheel 17 which is connected to the sprocket wheels 16 by a chain drive 18. Although rotation of the common control wheel 17 will cause rotation of the sprocket wheels 16 through the same angle, the distance through which the control members are moved will depend on the position of the sliders 12 in the guideways 13. If, by adjustment of the relative positions of the sliders 12 in their respective guideways 13, the effective length of one lever is set at twice the effective length of the other lever, the control member associated with the longer lever will move twice as far as the other control member for a given movement of the control wheel 17.

Figure 6:
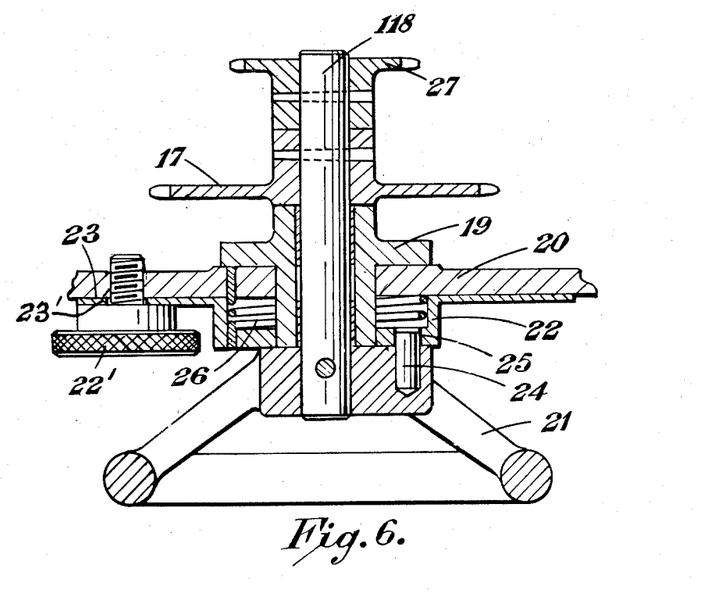
Figure 6 is an enlarged section of the control wheel shown in Figure 1.

The common control wheel 17 is mounted on a spindle 118 (see Figure 6) rotatable in a bearing 19 provided in the cover 20 of the control panel. The spindle 118 may be rotated by means of a hand wheel 21 fixed to that end of the control spindle which projects through the cover 20. Rotation of the hand wheel 21 is limited by a locking plate 22 which is rotatable on the outer face of the bearing 19 but which may be locked to the cover 20 by means of a locking screw 22', the shank of which passes through an arcuate slot 23' in the flanged part 23 of the locking plate. The degree of movement of the hand wheel 21 relative to the locking plate 22 is limited by means of a pin 24 projecting from the hub of the hand wheel 21 into an arcuate slot 25 in the face of the locking plate 22. The locking plate 22 is connected to the cover 20 by means of a coil spring 26 so arranged that it urges the locking plate in an anti-clockwise direction relative to the cover. When the locking plate is being set by means of the hand wheel the effect of the spring therefore is to keep the pin 24 at one end of the slot 25.

It will be obvious, however, that when the locking plate is set and locked to the cover by means of screw 22', the pin 24 will be free to move to the other end of the slot 25, i.e. the hand wheel 21 and spindle 118 may still be rotated in an anti-clockwise direction so as to reduce the output of the pumps to zero.

On that end of the spindle 118, opposite to the hand wheel is fixed a sprocket wheel 27 which is connected by chain drive to a safety device arrangement which will be described later.

Each spindle 6 on the dial 1 is geared by means of a pinion 28 to the rotor 29 of a transmitter 30. The transmitter 30 is rotatably mounted in bearings 31 so that the stator thereof may be rotated by movement of a rack 32 with which it is in toothed engagement. The rack 32 is slidable in bearings 33 and positionally controlled by means of a slider 34 located in a slot 35 in a cross head 36 at one end of the rack.

The slider is carried on the longer arm 40 of a bell crank lever 37 which is pivotally mounted on the panel on a pin 38. The slider 34 is adjustable in a slot 39 in the longer arm 40 of the lever by means of adjusting screw 41. The outer end of the shorter arm 42 of the lever 37 carries a roller 43 which is in contact with a cam 44 rotatable on a pin 45 mounted on the panel.

It follows therefore that on rotation of the cam 44 the lever 37 will pivot according to the profile of the cam face and consequently will cause rotation of the stator 30 by means of the associated rack 32. For a given movement of the lever 37 the angle through which the stator is rotated will depend on the position of the slider 34 on the arm 40 of the lever. The nearer the slider 34 is to the pivot pin 38 the smaller will be the angle through which the stator 30 is rotated.

The position of the slider 34 is initially set in accordance with the viscosity of the liquid to be transferred by the associated pump and a suitable viscosity scale may be provided on the panel adjacent the arm 40 of the lever.

The cam 44 is rotatable by means of a rack 46 in engagement with a pinion 47 which is solid with the cam 44. The rack 46 slides at one end in a bearing 47' and at the other in a gland 48 of a pressure compensating cylinder 49. That end of the rack which projects into the pressure compensating cylinder 49 carries a piston 50. The piston 50 may be subjected to the pressure on the output side of the pump which is transmitted to the cylinder 49 through the pressure line 51. The rack 46 is biased against this pressure by means of helical spring 52 located in a recess 53 at that end of the rack opposite to the piston. That is to say, the stator 30 of the transmitter may be adjusted in response to variations in the pressure on the discharge side of the associated pump through the linkage comprising the rack 32, the slider 34, the lever 37, the cam 44 and the rack 46.

It will be seen therefore, that one side of the piston 50 is subjected to the discharge pressure from the pump while opposing movement of the piston 50 is the spring 52. This spring is of sufficient strength so that it is not fully compressed by the maximum discharge pressure likely to be met with and provides a predetermined distance of movement for the piston 50 to position it according to the discharge pressure of the pump. This means that different pump working pressures will move the rack 46 and then turn the cam 44 which will move the crank lever 37 around its pivot 38, causing the rack 32 of the viscosity scale to move and adjust the stator of the transmitter 30.

The viscosity scale is marked in such manner that the movement imparted to the stator of the transmitter 30 is in proportion to the slip which takes place in the pump at the viscosity referred to, and a further movement is transmitted to the stator of the transmitter from the pressure compensating cylinder to compensate for changes in slip which take place in the pump due to changes in the pressure. The curvature of the cam 44 is calibrated to the slip characteristics of the pump at different discharge pressures.

Figure 7:
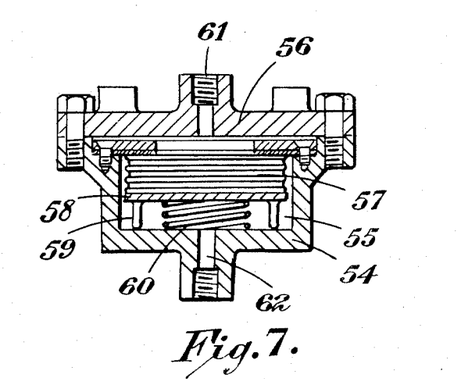
Figure 7 is an enlarged section of a pressure line adaptor shown in Figure 1.
Figure 11:
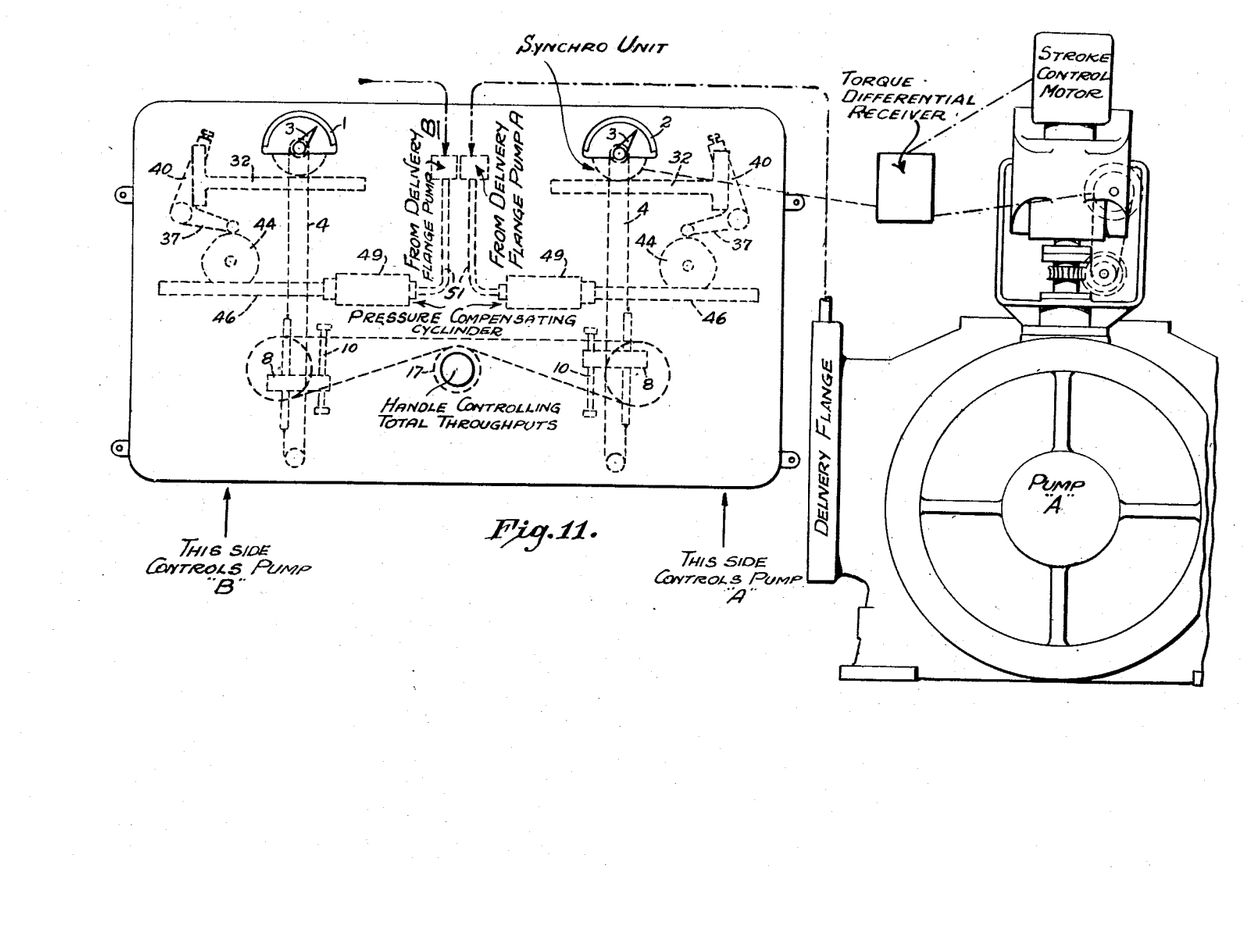
Figure 11 is a view showing the inter-relation of one of the pumps and the control panel.

In view of the fact that the pump may be used to handle a wide variety of oils the pressure compensating cylinders 49 are isolated from the liquid being pumped by adaptors 54, these being shown in detail in Figure 7. Inside the adaptor 54, is a bellows chamber 55 which is closed by a cover plate 56. The bellows chamber 55 is divided into two compartments by means of a flexible bellows 57 the free end of which is covered by a plate 58 having leg-like extensions 59 of such a length that the bellows cannot be stretched beyond their safe limit. A light spring 60 holds the bellows up against the pressure at the discharge side of the pump, connection to which is made through an inlet 61 in the cover plate 56. The pressure line 51 shown in both Figures 1 and 11, is connected to the other chamber through inlet 62 in the adaptor casing. The pressure compensating cylinder 49, the pressure line 51 and the associated chamber in the adaptor are filled with a suitable hydraulic oil so that the pressure at the discharge side of the pump may be transmitted to the piston 50.

This pressure is also transmitted through a branch line 63 to the safety device referred to above. In the event a valve in the discharge line of either pump is closed or partially closed so that pressure of the pumps rises toward a maximum safe presssure, a pressure limiting valve 64, hereinafter described in detail, comes into operation and automatically turns the output regulating wheel 21 toward zero to keep the output within the capacity given by normal pressure. This is to avoid any alteration in the blend ratio of the liquids being pumped, which might take place in the event a safety valve comes into operation due to a closed or partially closed valve at the end of the line.

Figure 4:
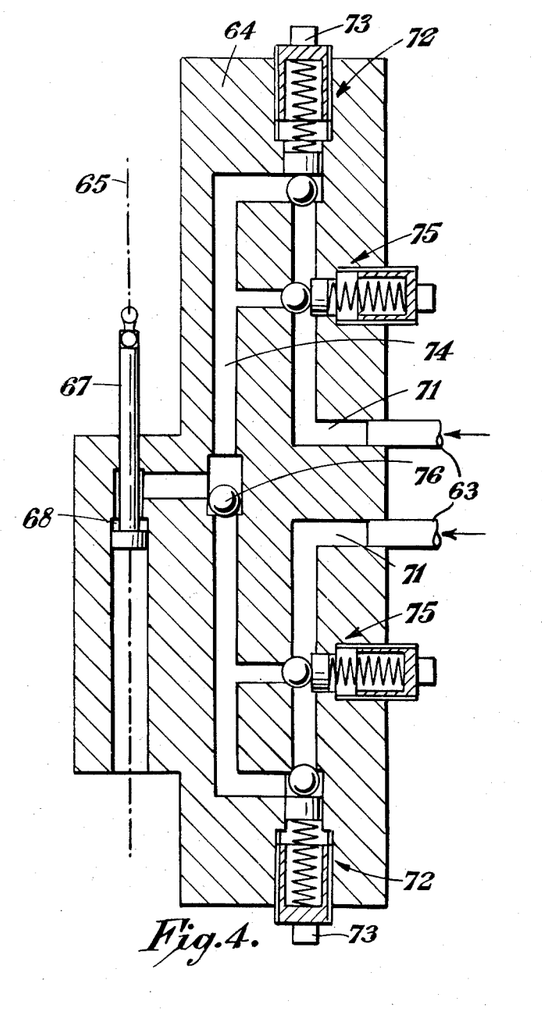
Figure 4 is a section, on a larger scale, of the pressure limiting valve shown in Figure 1.

This pressure limiting valve 64 is hydraulically connected to the discharge sides of the pumps and linked to the output regulating handwheel. It follows that when the presusre of either or both pumps approaches the maximum pressure setting, the output control handwheel on the panel is automatically rotated toward zero until the pump discharge pressure and output become equalized. The limiting pressure valve 64 is linked to the sprocket wheel 27, associated with the common control, by means of a chain 65 which passes over the sprocket wheel 27 and an idling wheel 66. The ends of the chain are attached to a piston 67 located in a cylinder 68 (see Figure 4) in the body of the limiting pressure valve 64. The limiting pressure valve 64 comes into operation as a safety device when the pressure in cylinder 68 reaches a predetermined setting controlled by the tension in a spring 69 (see Figure 1) connected to the chain 65 by a cranked lever 70.

Each branch line 63 is connected to an inlet passage 71 in the body of the valve 64. In the inlet passage 71 is a spring loaded ball valve 72 which is lifted when the pressure in the inlet passage reaches the value determined by the setting of an adjusting screw 73 in the wall valve. When the ball valve 72 lifts, the pressure in the branch line 63 is transmitted through the connecting passage 74 to the cylinder 68 and to the piston 67.

As shown in Figure 1, an increase in pressure in the cylinder 68 will cause the piston 67 to move downwards and thereby rotate the sprocket wheel 27 in an anticlockwise direction. Rotation of the sprocket wheel 27 in an anticlockwise direction will cause a similar movement of the common control wheel 17 against the action of the spring 26. This will cause rotation of the sprocket wheels 16 in such a direction that the output of the pumps are all reduced in the same proportion.

When the pressure in the branch line 63 falls, the ball valve 72 reseats itself and the pressure in the passage 74, which is now higher than in the passage 71, is relieved by means of spring loaded ball valve 75. The function of the cut-off valve 76 is to prevent transmission of the pressure exerted in cylinder 68 by one of the pumps to the branch line of the other pump.

In operation, therefore, when the pressure set up by a particular pump moves the associated piston 50 outwards, the control wheel 17 will be turned toward zero to reduce the capacity of the pump sufficiently to reduce the pressure. When this pressure at the inlet side of the valve 64 takes place, the associated ball valve 75 is lifted, releasing the pressure behind the piston 50 and allowing it to return in the opposite direction until such time as the output and pressure become balanced.

Briefly summarising the operation of the device described so far, any departure from the normal working of the system of pumps at their initial setting will give rise to one or more signals at the control panel.

(a) Movement of the control wheel 17, either by actuation of hand wheel 21 by an operative or by the automatic operation of the safety device 64, will result in a movement of the needles 3 on the output scales which is transmitted to the rotors 29 of the transmitters 30.

(b) Pressure or viscosity variations in the liquid being pumped will be detected in the pressure compensating cylinder and, through the action of the linkage described, a movement will be imparted to the stator of the appropriate transmitter 30.

The resulting signal produced in either of the ways (a) and (b) will cause the transmitters 30 to be actuated in the manner known to those skilled in the art.

It follows that the output settings on the control panel 1 have to be transmitted to the capacity mechanism (Figure 5) at the pump, and this is achieved by the transmitters 30 being each connected to a pump output control mechanism by means of which the output of the pump may be adjusted in accordance with signals from the control panel.

Figure 8:
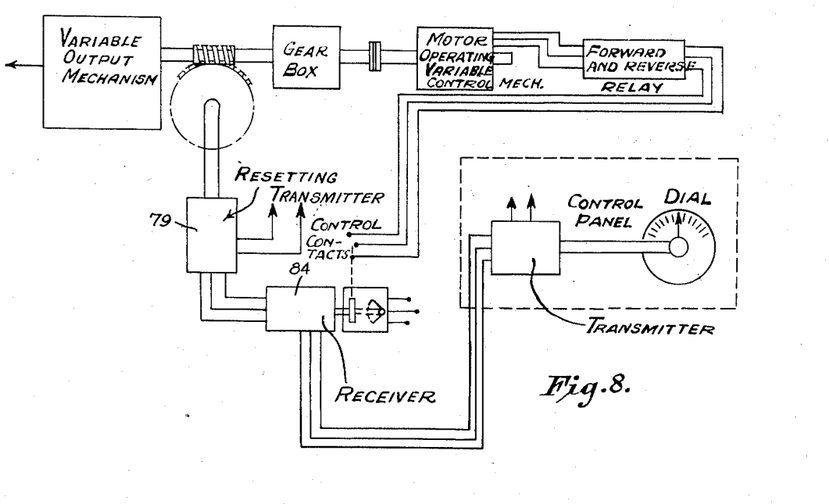
Figure 8 is a layout to illustrate the wiring of the control circuits embodied in the control panel and transmitters.

As seen in Figure 8, the pump output control mechanism comprises a receiver interposed between the transmitter at the control panel and a further transmitter which performs a resetting action. The 3-phase stators of the transmitter and resetting transmitter are connected to the receiver, one to the rotor and the other to the stator thereof, respectively.

Since the torque differential receiver has two magnetic fields, each controlled by a transmitter, its rotor will align itself so that the two fields coincide. As the pointer on the control panel is rotated a rotary movement is given to the rotor of the transmitter causing the rotor of the receiver to respond and thereby to close control contacts and bring into action a motor which operates mechanism for varying the pump output, so that the output of the pump is restored to the required value. At the same time the rotor of the resetting transmitter is turned through suitable gearing causing the second magnetic field in the receiver to rotate until it is in alignment with the new position of the first magnetic field at which time the control contacts are opened to cut out the output-varying mechanism of the pump.

This construction is shown in Figure 5 which shows the mechanism applied to an infinitely variable capacity pump of the type where the pump capacity is controlled by a rotatable shaft 89.

The output control mechanism comprises a casing 77 (see Figure 5) to which is secured by means of a bracket 78 a resetting transmitter 79 of similar construction to the transmitter 30. Mounted on the rotor 80 of the transmitter 79 is a coupling 81 having pins 82 in engagement with a sprocket wheel 83.

As the transmitter 30 on the control panel is actuated either by the scale pointer or by pressure variations on the discharge side of the pump it actuates a receiver 84 incorporating a switch which is thereby operated to start an electric motor 85 mounted on the casing 77 by means of bracket 86. The motor 85 is geared through pinions 87 and 88 to the shaft 89 connected to mechanism for varying the output of the pump.

In the case of an infinitely variable capacity pump turning of the shaft 89 is arranged to vary the stroke whereas in the case of a fixed output pump turning of the shaft 89 is arranged to adjust the infinitely variable speed gear through which the pump is driven.

Mounted on the shaft 89 is a worm 90 which engages with a worm wheel 91 mounted on a cross shaft 92. The cross shaft 92 carries a sprocket wheel 93 which is connected by a chain 94 to the sprocket wheel 83.

When the motor 85 is switched on by the action of receiver 84 it turns the spindle 89 and at the same time through worm 90, worm wheel 91 and chain drive 94 turns the rotor of the resetting transmitter 79. This causes the second magnetic field in the receiver 84 to rotate until the two fields therein are in alignment at which point the switch in the unit 84 comes into operation to stop the motor 85.

The ratio of the gearing between the shaft 89 and the transmitter 79 equals the ratio of angular displacement required by the shaft 89 to give the maximum capacity of the pump when adjusted from the zero output at zero pressure to the maximum angular displacement of the rotor 80 when adjusted from its zero position.

Summarising therefore, the ratio between the output of the two pumps is set by means of the adjusting screws 14 and the absolute outputs of the pumps are controlled by the hand wheel 21. Adjustments to allow for the different viscosities of the fluids to be pumped are made by means of the adjusting screws 41, and pressure variations on the discharge side of the pump are automatically taken into account through the linkages incorporating the cam 44, the cam being calibrated to the slip characteristics of the pump at different discharge pressures. Rotation of either the rotor or the stator of the transmitter 30 brings into action the receiver 84 to which it is electrically linked and this action is applied to make appropriate adjustment of the output of the pump.

When the two pumps are placed some distance apart, so that it becomes impracticable to lead pressure lines to the pressure compensating cylinders 49 on the control panel, then the pressure and viscosity adjusting linkage may be located with the pump output control mechanism. In this case the control panel will then consist only of the common control linked to the ratio controls, the transmitters 30 then being directly rotatably mounted on the control panel instead of in bearings 31 as described above.

Figure 10:
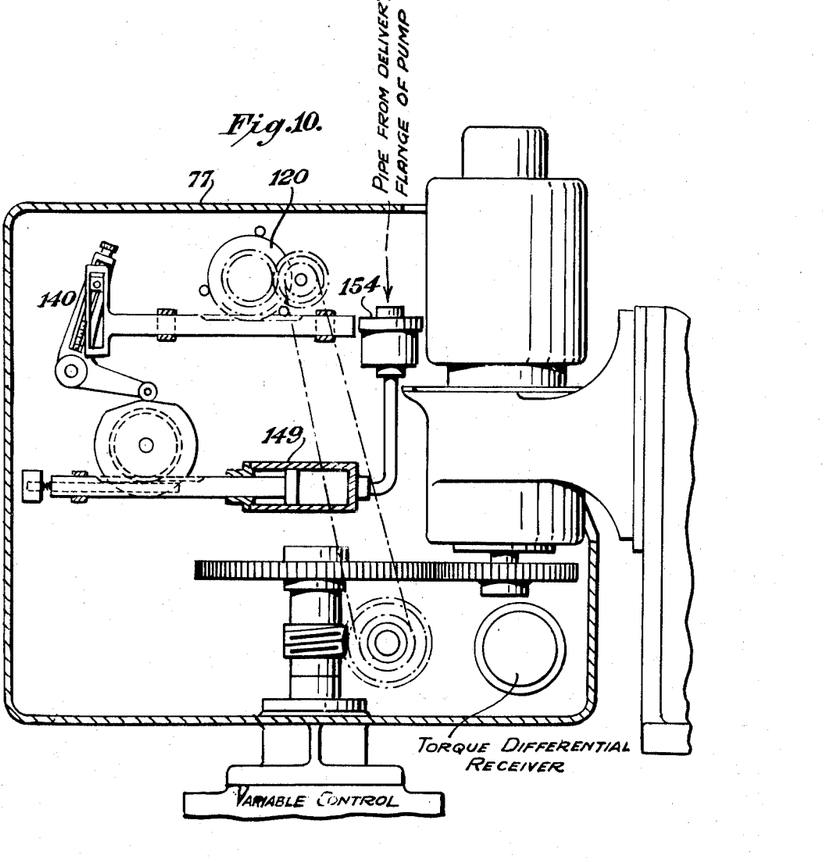
Figure 10 is a diagrammatic layout of the output control mechanism used in conjunction with the control panel of Figure 9.

Referring now to Figures 9 and 10 there is shown an arrangement where the two pumps are spaced apart from one another and comprising a control panel 100 provided with a central control wheel 101. Incorporated in this central panel are the ratio scale and link mechanism which are indicated generally at 114, their construction and operation being identical with those of the parts shown in Figure 1 and denoted by the references 11 to 16 inclusive, each of the sprockets indicated at 116 being coupled by a chain drive 117 to a sprocket 119 fast on the spindle of the central control wheel 101. As in the Figure 1 construction, the ratio scale and link mechanisms 114 operate the output scales 1 together with their pointers 3, the output scales 2 being coupled to the transmitters 121, that is the electrical transmitters, as described in connection with Figure 1, but in this case the electrical transmitters are rigidly mounted on the casing 100 instead of being rotatably mounted as in the Figure 1 arrangement.

The pressure compensating cylinder indicated at 149, viscosity correcting gear, including the viscosity scale indicated at 140, and associated parts together with the bellows chamber 154, are mounted in the vicinity of the pump and conveniently are attached to the cover plate of the pump casing, which corresponds to the part 77 shown in Figure 5.

In the arrangement shown in Figure 10 the electrical transmitter 120, which is positively coupled to its counterpart 121, Figure 9, will be rotatably mounted in a manner similar to the rotor 29 of the transmitter 30, shown in Figure 1 and connected, as already explained, to the viscosity correcting gear and pressure compensating cylinder 149, which is responsive to the dicharge pressure of the pump.

What is claimed is:

1. A control mechanism for a system of pumps, comprising primary settable means connected to each pump for setting the output thereof, each primary settable means being adjustable individually to set the outputs of the pumps in a given ratio, a common control device, means linking said common control device to all of said primary settable means for the simultaneous adjustment thereof to vary the outputs of the pumps but to maintain said outputs in said given ratio, a secondary settable means operatively connected to each primary settable means for adjusting the output of said pumps independently of said common control device, said secondary settable means being arranged to make such adjustment independently of each other, and means including a pressure sensitive device connected to detect the pressure at the discharge side of each pump, each of said last named means being connected to the associated secondary settable means for the adjustment thereof automatically in response to pressure changes in said discharge, whereby the output of each pump may be controlled so as to maintain said given ratio of outputs.

2. A control mechanism in accordance with claim 1, provided with safety means connected so as to detect the pressure at the dicharge side of each pump and operatively connected to said common control device for actuating such device to reduce the output of all of said pumps when the discharge pressure in any of said pumps rises above a predetermined value.

3. A control mechanism in accordance with claim 1, in which said linking means comprises a wheel for each primary settable means, said wheel being mounted on a fixed axis and being operatively connected to the primary settable means of the associated pump for adjusting the output thereof upon turning movement of such wheel, and means interposed between said wheel and said primary settable means for determining the effectiveness of each wheel for adjusting the associated pump upon turning movement of such wheel upon operation of said common control device.

4. A control mechanism in accordance with claim 1, in which said linking means comprises a wheel for each primary settable means, said wheel being mounted on a fixed axis and being operatively connected to the primary settable means of the associated pump for adjusting the output thereof upon turning movement of such wheel by means of a member arranged for movement with each wheel, said movement being in an orbit about the axis of said wheel, said member being connected for utilizing its movement to adjust the associated primary settable means, and means for adjusting the distance of each member from the axis of the associated wheel whereby the effect of a turning movement of said wheel upon the associated pump may be adjusted.

5. A control mechanism for a system of pumps, comprising primary settable means connected to each pump for setting the output thereof, each primary settable means being adjustable individually to set the outputs of the pumps in a given ratio, a common control device, means linking said common control device to all of said primary settable means for the simultaneous adjustment thereof to vary the outputs of the pumps but to maintain said outputs in said given ratio, said linking means comprising a wheel for each primary settable means, each wheel being mounted on a fixed axis and being operatively connected to the primary settable means of the associated pump for adjusting the output thereof, a guideway movable with each wheel and diametrically disposed with respect thereto, a member slidable in each guideway and connected to adjust the associated primary settable means, and means for moving said member along said guideway to adjust the distance of such member from the axis of the associated wheel, a secondary settable means operatively connected to each primary settable means for adjusting the output thereof independently of said common control device, said secondary settable means being arranged to make such adjustment independently of each other, and means including a pressure sensitive device connected so as to detect the pressure at the discharge side of each pump, said last named means being connected to the associated secondary settable means for the adjustment thereof automatically in response to pressure changes in said discharge, whereby the output of each pump may be controlled so as to maintain said given ratio of outputs.

6. A control mechanism according to claim 5, wherein said secondary settable means comprises a cylinder connected to the output side of each pump, a piston in said cylinder movable in one direction by pressure therein, means biasing such piston in the opposite direction, and means connected to be operated by each piston upon movement thereof in said first named direction for operating said primary settable means for reducing the output of the associated pump.

7. A control mechanism according to claim 5, wherein said wheels are sprocket wheels of the same size, a chain connecting said sprocket wheels for simultaneous rotation thereof, and a driving sprocket wheel connected to said chain for driving the same, said driving sprocket forming part of said common control device.

8. A control mechanism according to claim 5, provided with safety means connected to detect the pressure at the discharge side of each pump and operatively connected to said common control device for actuating such device to reduce the output of all of said pumps when the discharge pressure in any of said pumps rises above a predetermined value.

9. A control mechanism for a system of pumps, comprising primary settable means connected to each pump for setting the output thereof, each primary settable means being adjustable individually to set the outputs of the pumps in a given ratio, a common control device, means linking said common control device to all of said primary settable means for the simultaneous adjustment thereof to vary the outputs of the pumps but to maintain said outputs in said given ratio, safety means connected to detect the pressure at the discharge side of each pump and operatively connected to said common control device for actuating such device to reduce the output of all of said pumps when the discharge pressure in any of said pumps rises above a predetermined value, manually operable means connected to said common control device for operating it within predetermined limits independently of said safety means, a secondary settable means operatively connected to each primary settable means for adjusting the output of said pumps independently of said common control device, said secondary settable means being arranged to be adjustable independently of each other, and means including a pressure sensitive device connected to detect the pressure at the discharge side of each pump, said last named means being connected to the associated secondary settable means for the adjustment thereof automatically in response to pressure changes in said discharge, whereby the output of each pump may be controlled to maintain said given ratio of outputs.

10. A control mechanism for a system of pumps, comprising primary settable means connected to each pump for setting the output thereof, each primary settable means being adjustable individually to set the outputs of the pumps in a given ratio, a common control device, means linking said common control device to all of said primary settable means for the simultaneous adjustment thereof to vary the outputs of the pumps but to maintain said outputs in said given ratio, a secondary settable means operatively connected to each primary settable means for adjusting the output of the pumps independently of said common control device, the said secondary settable means being arranged to make such adjustment independently of each other, and means including a pressure sensitive device connected to detect the pressure at the discharge side of each pump, said last named means being connected to the associated secondary settable means for the adjustment thereof automatically in response to pressure changes in said discharge, whereby the output of each pump may be controlled to maintain said given ratio of outputs, said pressure sensitive device comprising a cylinder for each pump connected to the output side thereof, a piston in said cylinder movable in one direction by pressure therein, means biasing such piston in the opposite direction, a cam operable by each piston, a lever having an end engaging said cam and fulcrumed at a point intermediate its ends, the arm of said lever remote from said cam being operatively connected to said secondary settable means for adjusting the same, and adjustable means adapted to adjust the effective length of the arm of said lever remote from said cam whereby the sensitivity of said pressure sensitive device may be adjusted.

11. A control mechanism according to claim 10, wherein said lever is a bell crank lever the said remote arm of which is provided with a longitudinal guideway, said adjustable means comprising a sliding member in said guideway adjustable toward and away from the fulcrum of said lever to vary the effective length of said remote arm.

12. A pumping system comprising a plurality of pumps, each pump being connected to an independent source of supply for pumping fluid therefrom, a primary settable means connected to each pump for adjusting the output thereof, each primary settable means being adjustable to set the outputs of said pumps in a given ratio, a common control device, means linking said common control device to all of said primary settable means for the simultaneous adjustment thereof to vary the said outputs but to maintain said outputs in said given ratio, a secondary settable means operatively connected to each primary settable means for adjusting the output of the pumps independently of said common control device, a pressure-transmitting device for each pump in fluid communication with the discharge side thereof, a pressure sensitive mechanism for each pump operatively connected to the associated pressure transmitting device, each said pressure sensitive mechanism being connected to one of said secondary settable means for the adjustment of said secondary means automatically in response to pressure changes in said discharge whereby the output of each pump may be controlled to maintain said given ratio of outputs.

13. A pumping system according to claim 12, wherein each pressure-transmiting device is connected to a comon safety device for transmission of pressure thereto, said safety device being connected to the common control device and being actuated by a pressure above a predetermined value to actuate said common control device to reduce the outputs of the pumps.

14. A pumping system according to claim 12, wherein said linking means comprises a wheel associated with each primary settable means adapted for rotation about a fixed axis and a member arranged for movement with said wheel in an orbit about the axis of said wheel, said member being connected to and operative for adjusting the associated primary settable means, and means for adjusting the idstance of said member from the said axis whereby the effect of a turning movement of said wheel upon the associated pump is adjustable, the said pressure sensitive mechanism comprising a cylinder connected to the associated pressure-transmitting device for transmission to said cylinder of the pump discharge pressure, a piston in said cylinder movable in one direction in response to said discharge pressure, spring means biasing such piston in the opposite direction, a cam operable by said piston and having an outline in accordance with the slip characteristics of the associated pump, a bell crank lever engaging said cam at one end thereof, the arm of said lever remote from said cam being provided with a longitudinal guideway, a sliding member in said guideway adjustable toward and away from the fulcrum of said lever to vary the effective length of said remote arm, said pressure sensitive mechanism being connected through said sliding member to the secondary settable means of the associated pump, a common safety device operatively connected between each said pressure-transmitting mechanism and said common control device and actuated by a pressure above a predetermined value to actuate said common control device to reduce the outputs of said pumps, and manually operable means for operating said common control device within predetermined limits independently of said safety device.

References Cited in the file of this patent

UNITED STATES PATENTS

| | | |
|---|---|---|
| 1,012,687 | Melton | Dec. 26, 1911 |
| 2,036,810 | Hurrell | Apr. 7, 1936 |
| 2,354,634 | Griswold | July 25, 1944 |
| 2,564,306 | Isreeli et al. | Aug. 14, 1951 |